(12) United States Patent
Greene (10) Patent No.: US 6,796,250 B1
(45) Date of Patent: Sep. 28, 2004

(54) WASTE WATER RECOVERY AND UTILIZATION SYSTEM

(76) Inventor: Brian W. Greene, 29 Filbert St., Quincy, MA (US) 02169

( * ) Notice: Subject to any disclaimer, the term of this patent is extended or adjusted under 35 U.S.C. 154(b) by 32 days.

(21) Appl. No.: 10/366,290

(22) Filed: Feb. 13, 2003

(51) Int. Cl.[7] .............................. F23B 7/00; F23G 7/04
(52) U.S. Cl. ..................................... 110/233; 110/238
(58) Field of Search ............................ 210/257.1, 175, 210/180, 104, 243, 748, 222; 110/234, 233, 238, 342, 346; 205/628, 633, 637; 204/278, 266

(56) References Cited

U.S. PATENT DOCUMENTS

| | | | | |
|---|---|---|---|---|
| 3,599,582 A | * | 8/1971 | Langstrom .................. | 110/159 |
| 3,706,662 A | * | 12/1972 | Wellford, Jr. ................ | 210/748 |
| 3,875,357 A | * | 4/1975 | Foster et al. ................ | 210/758 |
| 3,954,069 A | | 5/1976 | Loken | |
| 4,045,314 A | * | 8/1977 | Rod et al. ................... | 210/748 |
| 4,886,607 A | * | 12/1989 | Lalonde et al. ............. | 210/739 |
| 4,960,513 A | * | 10/1990 | Young ......................... | 210/104 |
| 5,403,498 A | * | 4/1995 | Morrissey et al. ........... | 210/767 |
| 6,309,542 B1 | * | 10/2001 | Kim ............................ | 210/222 |

* cited by examiner

*Primary Examiner*—Kenneth B. Rinehart
(74) *Attorney, Agent, or Firm*—Joseph R. Birkner (57) ABSTRACT

A waste water recovery and utilization system that converts waste water including gray water, liquid sewerage waste and solid macerated sewerage waste to steam and to electricity comprises a gray water tank, a sewerage tank, a steam generator with a gray water crucible for vaporizing the gray water and a sewerage crucible for vaporizing the liquid sewerage waste and for incinerating the solid macerated sewerage waste thereby generating steam for space heating. A variable speed injection pump cooperates with the gray water tank, with the sewerage tank, with the gray water crucible and with the sewerage crucible. Condensate is collected in a condensate tank. The system is operable on multiple fuels, including hydrogen and oxygen provided by the system, natural gas and liquid propane gas. Alternate energy including solar, wind and mechanical, supply electrical power to an electrolysis machine when conventional electrical energy is to be conserved.

20 Claims, 7 Drawing Sheets

WASTE WATER RECOVERY AND UTILIZATION SYSTEM

FIELD OF THE INVENTION

This invention relates generally to waste water recyclying. More particularly, the present invention relates to a waste water recovery and utilization system that converts waste water to usable energy for use by a wide variety of heating and energy applications.

BACKGROUND OF THE INVENTION

Waste water in the form of gray water and sludge is reclaimed by various methods such as the employing of scrubbers to chemically treat and clean the waste water resulting from a wide variety of waste water streams relative to industrial processes and to commercial and domestic wastes. For example, typical domestic and commercial wastes include those originating from toilets, sinks, drains, laundry, showers, baths and dishwashers. Such wastes are typically discharged, unprocessed, to sewers and septic tanks. Other gray water sources include rain water and melting snow and ice from roofs of homes and commercial facilities which, too, unfortunately are not recovered or utilized in an efficient manner. The reason for the nonutilization of such gray water sources is because there are no known prior art devices or cost effective reclamation systems that are suitable for domestic and commercial applications that can conserve energy and preserve the ecology.

In view of the above mentioned problems and limitations, it was recognized by the present inventor that there is an unfulfilled need for a system which collects, processes and converts gray water to energy that can be utilized for heating, for generating electricity and for other uses.

Accordingly, it becomes clear that there is a great need for a waste water recovery and utilization system that provides the benefits mentioned above and one which overcomes the disadvantages of the prior art devices and methods. Such a system should be one that is highly efficient and is economically manufactured.

SUMMARY OF THE INVENTION

It is therefore an object of this invention to provide a waste water recovery and utilization system which avoids the aforementioned problems of prior art devices.

It is another object of this invention to provide a waste water recovery and utilization system that minimizes the discharge of waste streams to the environment.

It is another object of this invention to provide a waste water recovery and utilization system that converts gray water to steam and to electricity.

It is another object of this invention to provide a waste water recovery and utilization system that converts solid waste material to steam and to electricity.

It is still another object of this invention to provide a waste water recovery and utilization system that utilizes alternative energy to convert gray water and solid waste material into electricity.

It is a further object of this invention to provide a waste water recovery and utilization system which may be manufactured from readily available materials by conventional manufacturing processes.

It is still a further object of this invention to provide a waste water recovery and utilization system that is simple in design, simple to manufacture, low in cost, safe and is easy to use.

This invention results from the realization that there is a great need for a waste water recovery and utilization system that converts gray water and solid waste material to energy. The resulting invention provides such benefits.

According to a first aspect of the present invention, disclosed is a waste water recovery and utilization system that converts gray water to steam and to electricity. The waste water recovery and utilization system comprises a gray water tank for receiving gray water from waste streams and for receiving make up water from a reservoir when gray water is insufficient to maintain the gray water tank at an operating fill level. A steam generator has a burner means which vaporizes the gray water and thereby generates steam for space heating upon demand. An injector means cooperates with the gray water tank and with the burner means. A condenser with a condenser coil therein throughwhich the steam is selectively allowed to pass produces condensate when cooled by the gray water circulated through the condenser when steam for space heating is not needed. The condensate is collected in a condensate tank. An electrolysis machine cooperating with the condensate tank disassociates the condensate into hydrogen and oxygen. The oxygen and for the hydrogen is collected in a storage means that cooperates with the burner means and with an electrical power generator.

The second aspect, in accordance with the present invention, is a special case of the first aspect of this invention with additional features including a sewerage tank for receiving liquid sewerage waste and solid macerated sewerage waste from a toilet and burner means for vaporizing the liquid sewerage waste and for incinerating the solid macerated sewerage waste thereby generating steam for space heating upon demand.

The third aspect of the present invention is a special case of the first aspect and second aspects of this invention with additional features including alternate energy means for supplying electrical power to the electrolysis machine when conventional electrical energy is to be conserved.

DETAILED DESCRIPTION OF ILLUSTRATIVE EMBODIMENTS

Figure 1:
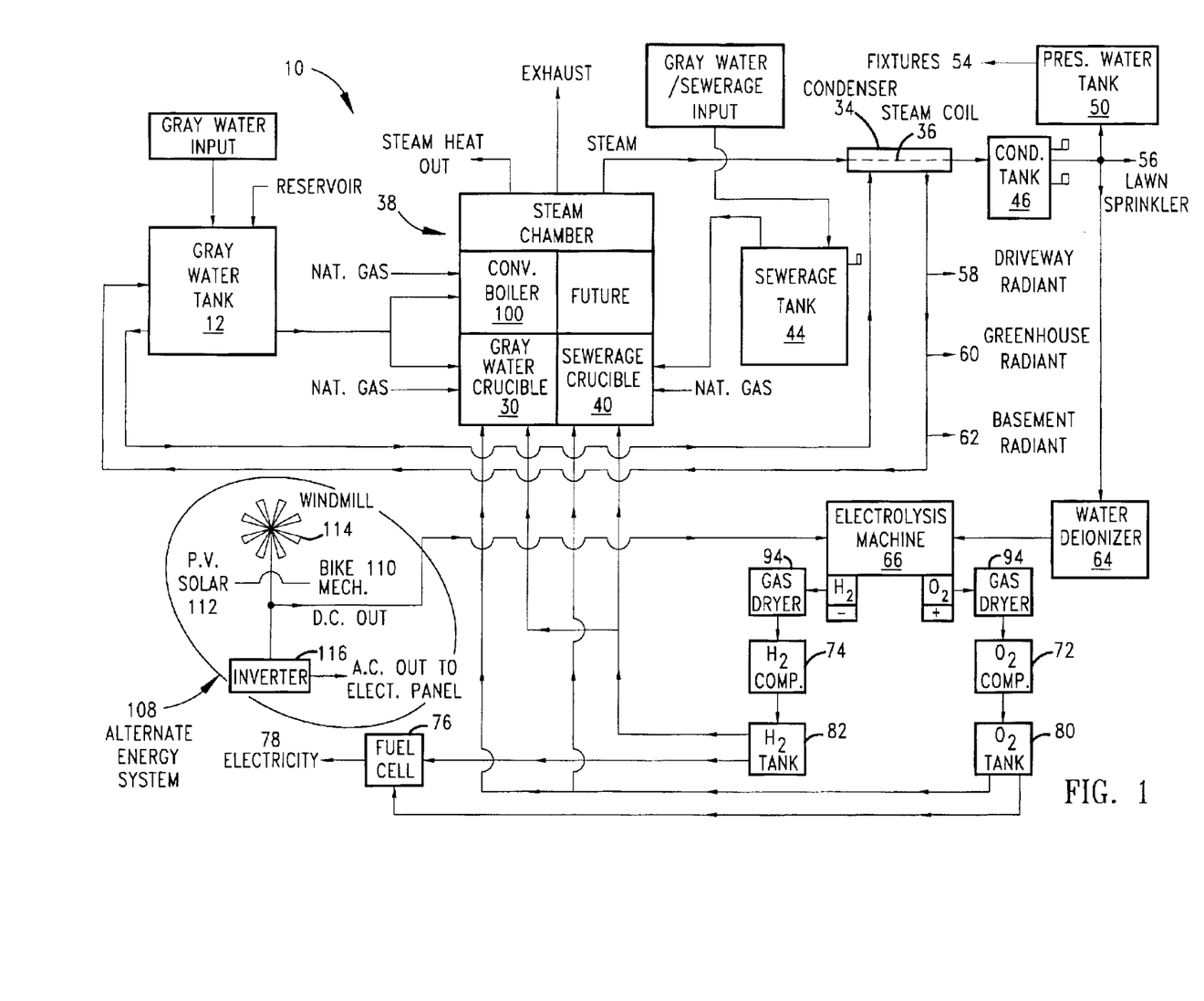
FIG. 1 is a schematic of an embodiment of a waste water recovery and utilization system of the instant invention.
Figure 1A:
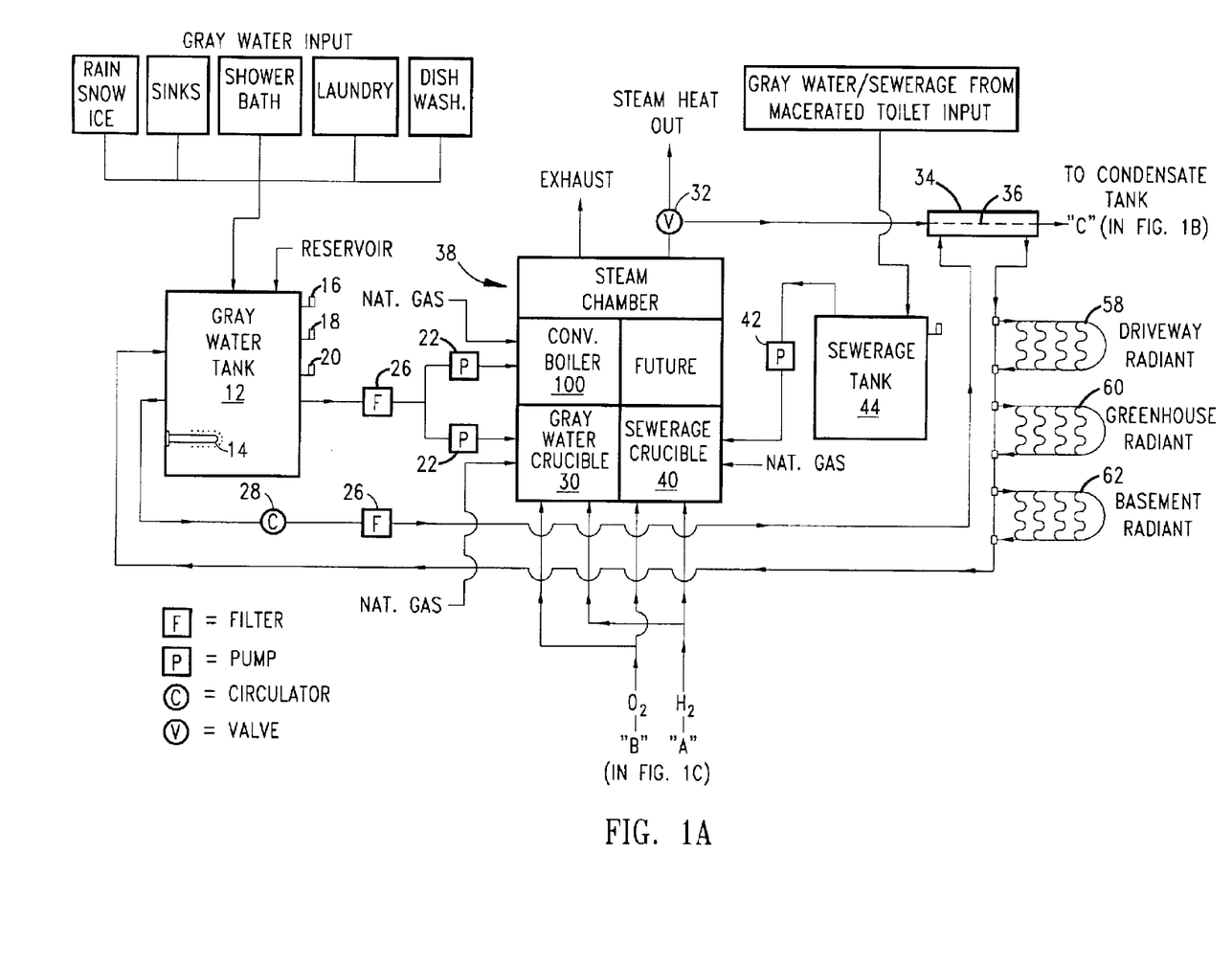
FIG. 1A is an enlarged partial schematic, shown up to "A", "B" and "C", of the embodiment of a waste water recovery and utilization system of the instant invention of FIG. 1, showing the gray water and sewerage inputs, a gray water tank, water level controls, a steam generator, a condenser, a sewerage tank, pumps, a circulator and filters.
Figure 1B:
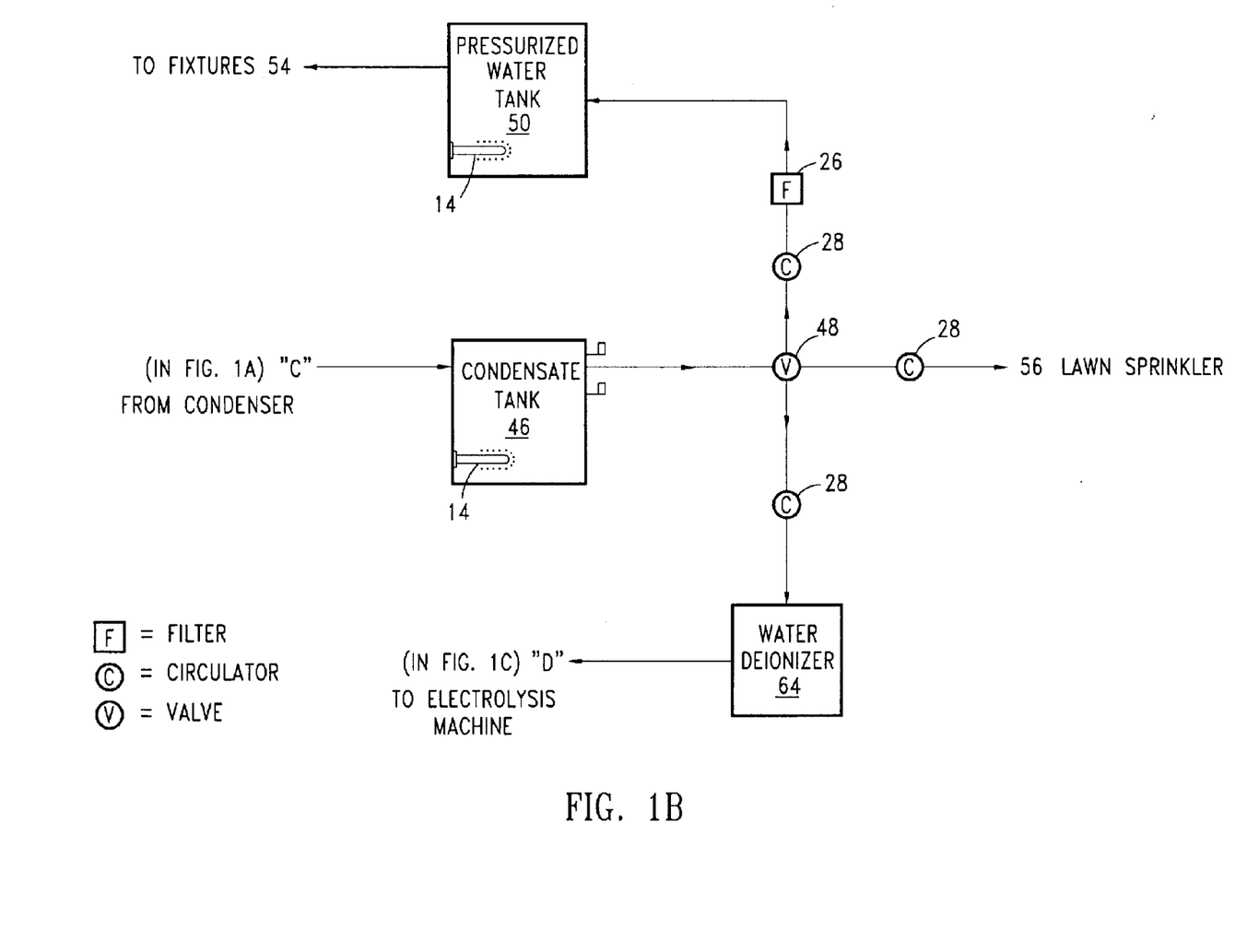
FIG. 1B is an enlarged partial schematic continuation of the embodiment of a waste water recovery and utilization system of the instant invention of FIG. 1A, from "C" and up to "D", showing a condensate tank, a pressurized water tank, a water deionizer, a circulator and a valve.
Figure 1C:
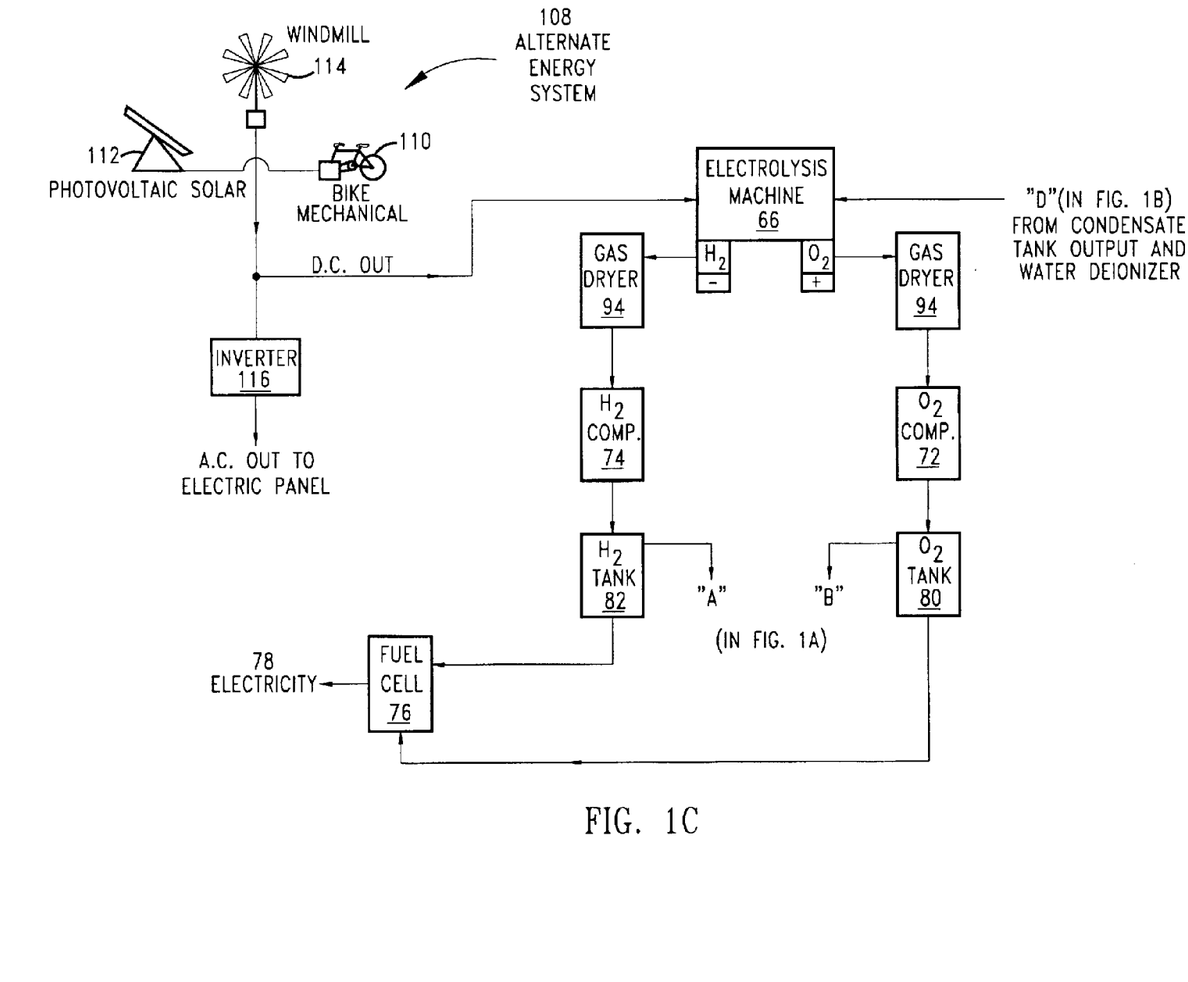
FIG. 1C is an enlarged partial schematic continuation of the embodiment of a waste water recovery and utilization system of the instant invention of FIG. 1B, from "D" with "A" and "B" as indicated, showing an electrolysis machine, a gas dryer, hydrogen and oxygen compressors and storage tanks, a fuel cell, an alternate energy system with an inverter.

Looking more particularly to the drawings, there is shown in FIGS. 1, 1A, 1B, 1C–4 an embodiment of a waste water recovery and utilization system that converts gray water and liquid sewerage waste and solid macerated sewerage waste from a toilet to steam and to electricity, the system is generally indicated at 10, according to an embodiment of the present invention. FIG. 1 is a schematic of an embodiment of the waste water recovery and utilization system 10 of the instant invention. Provided for clarity, FIGS. 1A, 1B and 1C are enlarged partial schematics, of the embodiment of the waste water recovery and utilization system 10 of FIG. 1, so that when joined together as depicted by "A", "B", "C" and "D", more clearly illustrate the components of FIG. 1.

Figure 3:
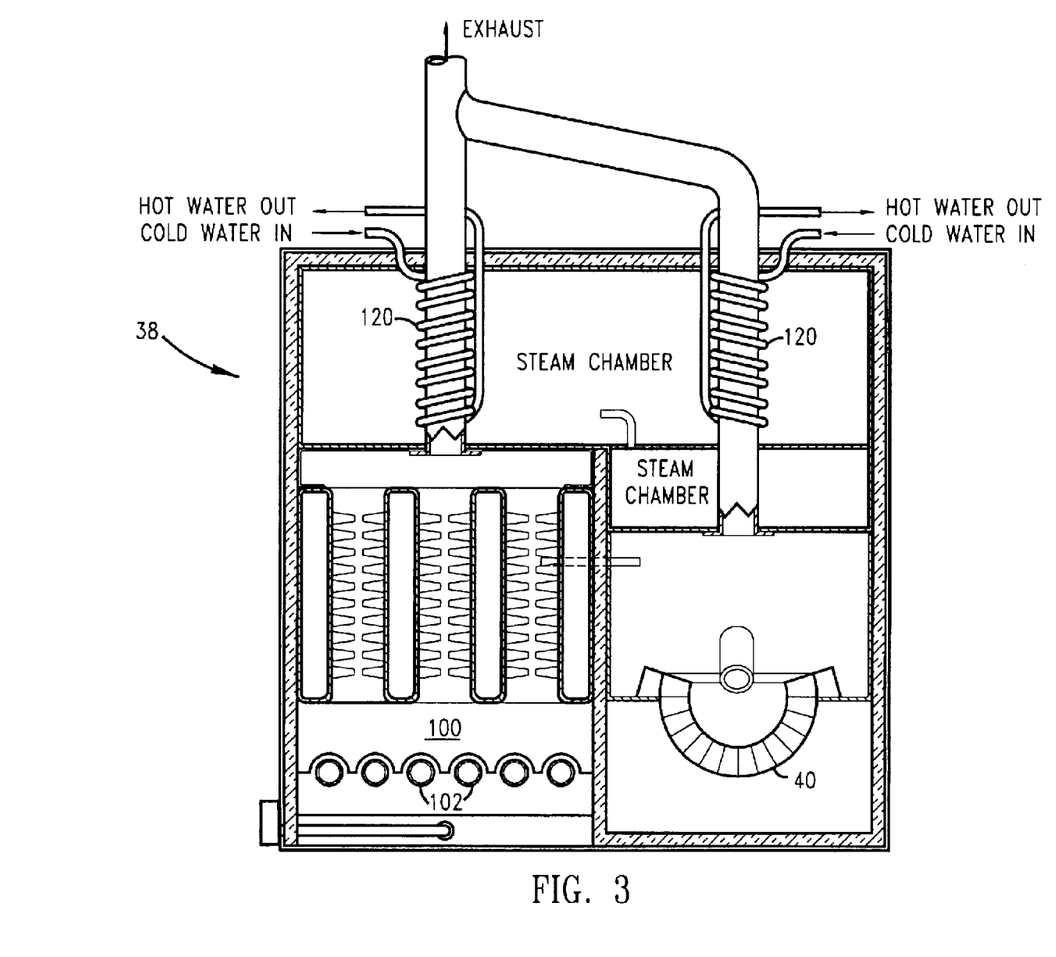
FIG. 3 is a cross sectional view taken along the lines 3—3 of FIG. 2 of an embodiment of a steam generator of a waste water recovery and utilization system of the instant invention.

As seen in FIGS. 1, 1A, 1B and 1C, the main components of the waste water recovery and utilization system 10 include a gray water tank 12, level control means including an upper level control 16, a middle level control 18 and a lower level control 20, an ultra violet sterilizer 14, a steam generator 38 with a burner means including a gray water crucible 30, a sewerage crucible 40 and a conventional boiler 100 having a tubular burner 102 shown in FIG. 3, an injector means including a variable speed injection pump 22, a circulator 28, a filter 26, a condenser 34 having a condenser coil 36 therein, a condensate tank 46, a water deionizer 64, an electrolysis machine 66, a gas dryer 94, an oxygen compressor 72, a hydrogen compressor 72, a storage means including an oxygen tank 80 and a hydrogen tank 82, a fuel cell 76 for producing electricity 78, and alternate energy means in the form of an alternate energy system 108 to produce D.C. voltage for powering the electrolysis machine 66 and an inverter 116, for converting D.C. voltage to A.C. voltage Other system components include a steam valve 32, a water valve 48, a pressurized water tank 50 with a diaphragm and conventional plumbing components (not shown) such as back flow preventers, temperature and pressure relief valves, pressure gages and regulators.

As best seen in FIG. 1, and in FIG. 1A, in one aspect, gray water discharged from waste streams such as rain, snow, melting ice, sinks, showers, baths, washing machines, laundry and dish washers is received in the gray water tank 12. This gray water is normally not utilized and is discharged to the environment and to sewers. Particularly in a commercial facility such as a hospital, corporation, factory, university, and an apartment complex, the waste is even more impactive on the environment. In such applications, the energy utilization provided by the instant invention can have a major effect. By collecting the wasted gray water, the waste water recovery and utilization system 10 converts the gray water to steam for space heating and to condensate when space heating is not needed. The variable speed injection pump 22 deposits the gray water from the gray water tank 12 onto the gray water crucible 30 of the burner means of the steam generator 38. The gray water crucible 30 flashes droplets of the gray water into steam when the gray water crucible 30 is heated to an elevated temperature sufficient enough to vaporize the gray water and to incinerate any solid residue. Steam may directed by the steam valve 32 for space heating or for other heating requirements such as for industrial processes or the like as needed. When steam for space heating and for other uses is not needed, the steam may then be directed by the steam valve 32 to the condenser 34 which has a condenser coil 36 therein throughwhich the steam is selectively allowed to pass and to condense when cooled by the gray water circulated by the circulator 28 from the gray water tank 12 through the condenser 34. The gray water may be selectively directed, as needed, to a driveway radiant 58, a greenhouse radiant 60, or to a basement radiant slab 62 for scavenging residual heat contained in the gray water prior to being returned to the gray water tank 12. Make up water from a reservoir may be provided to the gray water tank 12 in response to a level control means including an upper level control 16, a middle level control 18 and a lower level control 20. Particularly, the lower level control 20 allows the gray water tank 12 to be filled with the make up water when the gray water reaches the lower level control 20. The lower level control 20 also prevents the burner means from operating. The condensate is collected in the condensate tank 46 shown in FIG. 1 and in FIG. 1B, where it may be operationally directed by the water valve 48 and by the circulator 28 for use in lawn sprinklers 56 and, when filtered, to be stored in the pressurized tank 50 shown in FIG. 1 and in FIG. 1B, for use in fixtures 54. The collected condensate is also selectively directed to the water deionizer 64 and to the electrolysis machine 66 shown in FIG. 1 and in FIG. 1C, where the condensate is converted to oxygen and to hydrogen for power generation such as electricity 78 via the fuel cell 76 and for combustion. This occurs after the hydrogen and oxygen gases passes through the gas dryer 94, an oxygen compressor 72 and a hydrogen compressor 74 and is collected in the storage means including the oxygen tank 80 and the hydrogen tank 82.

Although not necessary for operation, to make the instant invention more useful, another aspect of the invention preferably includes a sewerage tank 44 shown in FIG. 1 and in FIG. 1A, for receiving liquid sewerage waste and solid macerated sewerage waste from a toilet. The burner means of the steam generator 38 comprises a sewerage crucible 40 that flashes the liquid sewerage waste into steam and incinerates the solid macerated sewerage waste when heated to an elevated temperature and when the liquid sewerage waste and the solid macerated sewerage waste are delivered from the sewerage tank 44 to the sewerage crucible 40 by the variable speed injection pump 22 whereby steam, oxygen and hydrogen are produced as described above.

Figure 2:
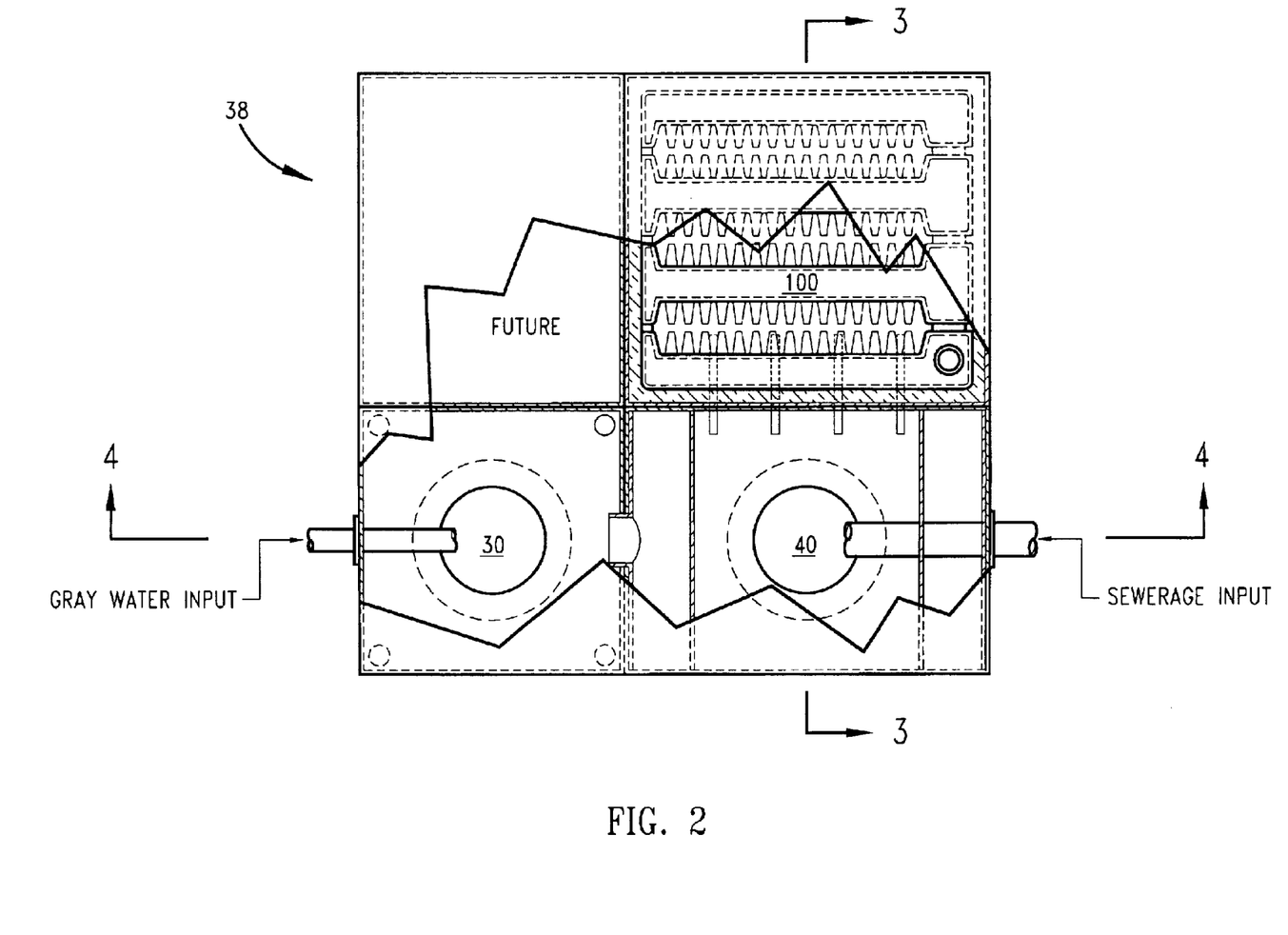
FIG. 2 is a partial plan view of an embodiment illustrative of a steam generator of a waste water recovery and utilization system of the instant invention.
Figure 4:
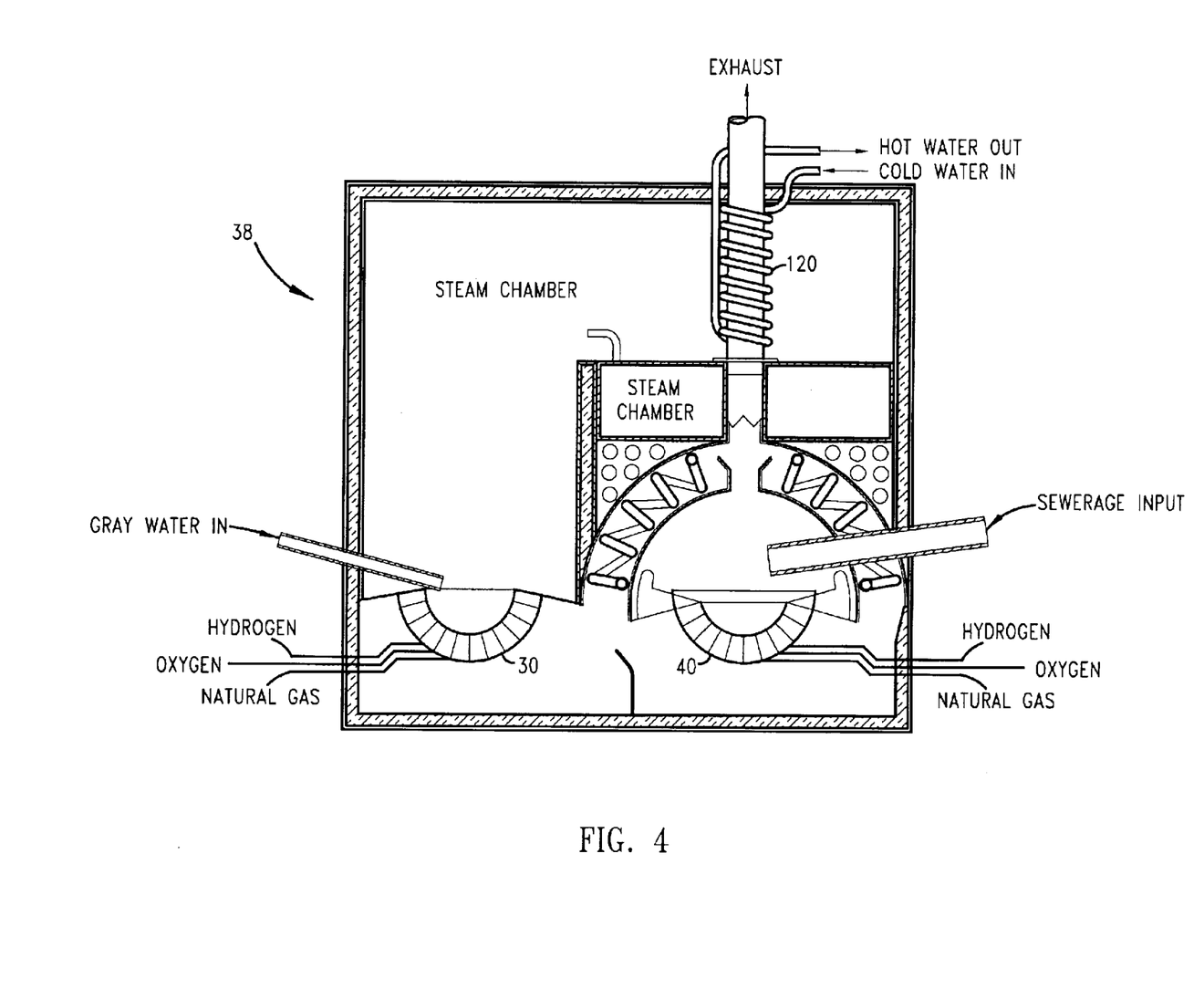
FIG. 4 is a cross sectional view taken along the lines 4—4 of FIG. 2 of an embodiment of a steam generator of a waste water recovery and utilization system of the instant invention.

The waste water recovery and utilization system 10, preferably includes the burner means of the steam generator 38, best seen in FIGS. 2 and 3, further comprising a conventional boiler 100 having a tubular burner 102. The conventional boiler 100 serves as a back up system that cooperates with the gray water tank 12 by receiving gray water to generate steam therefrom. Excess heat may be scavenged from the exhaust stack as seen in FIGS. 3 and 4, via a heat exchanger coil 120 through which water may be circulated and used as a preheater for domestic hot water and other system applications as required. To meet energy demand, future space for expansion for one of an additional boiler, a gray water crucible 30 and a sewerage crucible 40 is provided for the steam generator 38 as seen in FIG. 2.

It is understood that the sewerage crucible 40, the gray water crucible 30 and the tubular burner 102 are adapted to operate on multiple fuels, preferably hydrogen and oxygen provided by the instant invention as well as natural gas and liquid propane gas, for example, by utilizing fuel orifices also known in the trade as spuds, pressure regulators, controls and gas valves.

The waste water recovery and utilization system 10 preferably includes an alternate energy system 108 shown in FIG. 1 and in FIG. 1C for supplying D.C. electrical power to the electrolysis machine 66 when conventional electrical energy is to be conserved. The alternate energy system 108 is chosen from the group consisting of solar, wind and mechanical wherein the solar alternate energy means is photovoltaic 112, the wind alternate energy means is a wind mill 114, and the mechanical alternate energy means is a human pedal powered bicycle 110. The electrical power generator is a fuel cell 76. The inverter 116, converts the D.C. voltage from the wind mill 114 to A.C. voltage and feeds it back to an electrical panel or grid for subsequent use as needed.

The operation of the waste water recovery and utilization system 10, has been described above. With gray water collected in the gray water tank 12, and with hydrogen and oxygen available from the hydrogen tank 82 and the oxygen tank 80, when heating is needed, the gray water crucible 30 of the steam generator 38 is heated to an elevated temperature. It is understood, that if hydrogen and oxygen is not available or insufficient, one of natural gas and liquid propane gas may be used in the multifuel burner means. The variable speed injection pump 22 deposits the gray water from the gray water tank 12 onto the gray water crucible 30 of the burner means of the steam generator 38. The gray water crucible 30 flashes droplets of the gray water into steam when the gray water crucible 30 is heated to an elevated temperature sufficient enough to vaporize the gray water and to incinerate any solid residue. Steam may directed by the steam valve 32 for space heating or for other heating requirements such as for industrial processes or the like as needed. When steam for space heating and for other uses is not needed, the steam may then be directed by the steam valve 32 to the condenser 34 which has a condenser coil 36 therein throughwhich the steam is selectively allowed to pass and to condense when cooled by the gray water circulated by the circulator 28 from the gray water tank 12 through the condenser 34.

When the sewerage tank 44 for receiving liquid sewerage waste and solid macerated sewerage waste from a toilet is included, operation is as described above. The burner means of the steam generator 38 comprises the sewerage crucible 40 that flashes the liquid sewerage waste into steam and incinerates the solid macerated sewerage waste when heated to an elevated temperature and when the liquid sewerage waste and the solid macerated sewerage waste are delivered from the sewerage tank 44 to the sewerage crucible 40 by the variable speed injection pump 22 whereby steam, oxygen and hydrogen are produced as described above.

Depending upon power needs, the burner means may be selectively employed and ganged together to include operation of the gray water crucible 30, the sewerage crucible 40 and the tubular burner 102 in any desired combination to meet the demand.

Surprisingly, the instant invention provides an added advantage and recognizes a problem and adequately and completely addresses an unfulfilled need, in that the invention, in the manner disclosed, in effect, defines a highly efficient system for recovering waste streams and converting them to useful energy while preserving the environment.

The waste water recovery and utilization system 10 may be constructed in a wide variety of sizes and style variations to adapt to a particular application.

One practical advantage of the invention is that it provides a convenient, practical, low cost, waste water recovery and utilization system 10 which allows a user to conveniently recover waste water and utilize it to produce thermal and electrical power. Another advantage is that the waste water recovery and utilization system 10 may be sized and selectively operated for various residential, institutional and commercial applications. Another advantage is that the waste water recovery and utilization system 10 may be operated from alternate energy sources for an electrical power source for operating the system. A further advantage of the invention is that the waste water recovery and utilization system 10 is designed for ease of manufacture by standard methods and by using readily available materials.

Of course, a wide variety of further uses and advantages of the present invention will become apparent to one skilled in the art.

As disclosed, it is apparent that the instant invention can provide other heating and electrical generation options, depending upon the particular need. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain illustrative embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A waste water recovery and utilization system, said system comprising:
   a gray water tank for receiving gray water from waste streams and for receiving make up water from a reservoir when gray water is insufficient to maintain said gray water tank at an operating fill level;
   a steam generator having a burner means for vaporizing the gray water and thereby generating steam for space heating upon demand;
   an injector means cooperating with said gray water tank and with said burner means of said steam generator;
   a condenser having a condenser coil therein throughwhich the steam is selectively allowed to pass and to condense when cooled by the gray water circulated through said condenser when steam for space heating is not needed;
   condensate tank for collecting the condensate;
   an electrolysis machine cooperating with said condensate tank for disassociating the condensate into hydrogen and oxygen;
   a storage means for the oxygen and for the hydrogen; and
   said storage means cooperating with said burner means and with an electrical power generator.

2. The waste water recovery and utilization system of claim 1 wherein said burner means comprises a gray water crucible that flashes droplets of the gray water into steam when said gray water crucible is heated to an elevated temperature sufficient enough to vaporize the gray water and to incinerate any solid residue.

3. The waste water recovery and utilization system of claim 1 wherein said injector means includes a variable speed injection pump for depositing the gray water onto a gray water crucible.

4. The waste water recovery and utilization system of claim 1 wherein said gray water tank having level control means including an upper level control, a middle level control and a lower level control.

5. The waste water recovery and utilization system of claim 4 wherein said upper level control, prevents said gray water tank from being overfilled, said middle level control allows said system to function as long as the gray water in said gray water tank is between said lower level control and said upper level control and said lower level control also for allowing said gray water tank to be filled with the make up water from the reservoir when the gray water reaches said lower level control and said lower level control also prevents said burner means from operating.

6. The waste water recovery and utilization system of claim 1 further comprising a sewerage tank for receiving liquid sewerage waste and solid macerated sewerage waste from a toilet.

7. The waste water recovery and utilization system of claim 6 wherein said burner means of said steam generator comprises a sewerage crucible that flashes the liquid sewerage waste into steam and incinerates the solid macerated sewerage waste when heated to an elevated temperature and when the liquid sewerage waste and the solid macerated sewerage waste are delivered from said sewerage tank to said sewerage crucible by said injector means.

8. The waste water recovery and utilization system of claim 1 wherein said burner means of said steam generator further comprising a conventional boiler having a tubular burner wherein said conventional boiler serving as a back up system.

9. The waste water recovery and utilization system of claim 1 further comprising alternate energy means for supplying electrical power to said electrolysis machine when conventional electrical energy is to be conserved.

10. The waste water recovery and utilization system of claim 9 wherein said alternate energy means is chosen from the group consisting of solar, wind and mechanical.

11. The waste water recovery and utilization system of claim 9 wherein said solar alternate energy means is photovoltaic.

12. The waste water recovery and utilization system of claim 9 wherein said wind alternate energy means is a wind mill.

13. The waste water recovery and utilization system of claim 9 wherein said mechanical alternate energy means is a human pedal powered bicycle.

14. The waste water recovery and utilization system of claim 1 wherein said electrical power generator is a fuel cell.

15. A waste water recovery and utilization system which minimizes discharge of gray water waste streams to the environment, said system comprising:
   a gray water tank for receiving gray water from waste streams and for receiving make up water from a reservoir when gray water is insufficient to maintain said gray water tank at an operating fill level;
   a sewerage tank for receiving liquid sewerage waste and solid macerated sewerage waste from a toilet;
   a steam generator having a burner means operable on multiple fuels, including hydrogen and oxygen provided by said waste water recovery and utilization system, on natural gas and on liquid propane gas; and said burner means cooperating with said gray water tank and with said sewerage tank for vaporizing the gray water and the liquid sewerage waste and the solid macerated sewerage waste thereby generating steam for space heating upon demand;
   an injector means cooperating with said gray water tank, with said sewerage tank and with said burner means of said steam generator;
   a condenser having a condenser coil therein throughwhich the steam is selectively allowed to pass and to condense when cooled by the gray water circulated through said condenser when steam for space heating is not needed;
   a condensate tank for collecting the condensate;
   an electrolysis machine cooperating with said condensate tank for disassociating the condensate into hydrogen and oxygen;
   a storage means for the oxygen and for the hydrogen; and
   said storage means cooperating with said burner means and with a fuel cell for generating electricity.

16. The waste water recovery and utilization system of claim 15 wherein said burner means comprises a gray water crucible that flashes droplets of the gray water into steam when said gray water crucible is heated to an elevated temperature sufficient enough to vaporize the gray water and to incinerate any solid residue.

17. The waste water recovery and utilization system of claim 16 wherein said burner means of said steam generator comprises a sewerage crucible that flashes the liquid sewerage waste into steam and incinerates the solid macerated sewerage waste when heated to an elevated temperature and when the liquid sewerage waste and the solid macerated sewerage waste are delivered from said sewerage tank to said sewerage crucible by said injector means.

18. The waste water recovery and utilization system of claim 15 wherein said burner means of said steam generator further comprising a conventional boiler having a tubular burner wherein said conventional boiler serving as a back up system and said conventional tubular burner cooperate with said gray water tank.

19. The waste water recovery and utilization system of claim 15 further comprising alternate energy means for supplying electrical power to said electrolysis machine when conventional electrical energy is to be conserved.

20. A waste water recovery and utilization system which minimizes the discharge of gray water from rain, snow, melting ice, sinks, showers, baths, washing machines and dish washers to the environment by converting the gray water to energy with alternative energy sources, said system comprising:
   a gray water tank, for receiving gray water and for receiving make up water from a reservoir when gray water is insufficient to maintain said gray water tank at an operating fill level and said gray water tank having a water level control means;
   a sewerage tank for receiving liquid sewerage waste and solid macerated sewerage waste from a toilet;
   a steam generator having a gray water crucible that flashes droplets of the gray water into steam when said gray water crucible is heated to an elevated temperature sufficient enough to vaporize the gray water and to incinerate any solid residue when the gray water is delivered from said gray water tank to said gray water crucible; a sewerage crucible that flashes the liquid sewerage waste into steam and incinerates the solid macerated sewerage waste when heated to an elevated temperature when the liquid sewerage waste and the solid macerated sewerage waste are delivered from said sewerage tank to said sewerage crucible; a conventional boiler having a tubular burner wherein said conventional boiler cooperating with said gray water tank and serving as a back up system and said tubular burner cooperating with said gray water crucible, and with said sewerage crucible; and said gray water crucible, said sewerage crucible and said tubular burner being operable on multiple fuels, including hydrogen and oxygen provided by said waste water recovery and utilization system, on natural gas and on liquid propane gas;

a variable speed injection pump cooperating with said gray water tank, with said sewerage tank and with said gray water crucible and with said sewerage crucible of said steam generator;

a condenser having a condenser coil therein throughwhich the steam is selectively allowed to pass and to condense when cooled by the gray water circulated through said condenser when steam for space heating is not needed;

a condensate tank for collecting the condensate;

an electrolysis machine cooperating with said condensate tank and with a water deionizer for disassociating the condensate into hydrogen and oxygen;

a storage means for the oxygen and for the hydrogen;

said storage means cooperating with said burner means and with a fuel cell for generating electricity; and alternate energy means for supplying electrical power to said electrolysis machine when conventional electrical energy is to be conserved.

* * * * *